(12) United States Patent
Chen

(10) Patent No.: US 9,036,961 B2
(45) Date of Patent: May 19, 2015

(54) COMMUNICATION MEDIA MULTI-SWITCH SYSTEM

(75) Inventor: David Zhi Chen, Richardson, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 390 days.

(21) Appl. No.: 13/172,145

(22) Filed: Jun. 29, 2011

(65) Prior Publication Data

US 2013/0004121 A1    Jan. 3, 2013

(51) Int. Cl.
  *G02B 6/35*  (2006.01)
  *H04B 3/60*  (2006.01)
  *H04B 10/00* (2013.01)

(52) U.S. Cl.
  CPC .............. *G02B 6/3508* (2013.01); *H04B 10/22* (2013.01); *G02B 6/3556* (2013.01); *G02B 6/3574* (2013.01)

(58) Field of Classification Search
  CPC .............................. H04B 10/22; H04B 10/225
  USPC ............................... 385/16; 398/140, 141, 156
  See application file for complete search history.

(56) References Cited

U.S. PATENT DOCUMENTS

| | | | | |
|---|---|---|---|---|
| 4,492,427 A * | 1/1985 | Lewis et al. | | 385/26 |
| 4,834,488 A * | 5/1989 | Lee | | 385/57 |
| 4,953,932 A * | 9/1990 | Mihich | | 385/26 |
| 5,016,961 A * | 5/1991 | Aldrich | | 385/25 |
| 5,127,084 A * | 6/1992 | Takahashi | | 385/140 |
| 5,317,659 A * | 5/1994 | Lee | | 385/22 |
| 5,336,897 A * | 8/1994 | Watanabe et al. | | 250/551 |
| 5,664,034 A * | 9/1997 | Mock | | 385/16 |
| 5,699,463 A * | 12/1997 | Yang et al. | | 385/22 |
| 5,864,643 A * | 1/1999 | Pan | | 385/22 |
| 6,360,032 B1 * | 3/2002 | Berger et al. | | 385/16 |
| 6,870,981 B2 * | 3/2005 | Sherrer et al. | | 385/16 |
| 6,898,342 B2 * | 5/2005 | Sprague et al. | | 385/20 |
| 6,973,253 B2 * | 12/2005 | Steinberg et al. | | 385/140 |
| 6,980,715 B2 * | 12/2005 | Guy | | 385/26 |
| 7,058,254 B2 * | 6/2006 | Nagahata et al. | | 385/22 |
| 7,248,761 B2 * | 7/2007 | Schilling et al. | | 385/25 |
| 7,286,768 B2 * | 10/2007 | Lohr et al. | | 398/141 |
| 8,374,506 B2 * | 2/2013 | Stark | | 398/114 |
| 2001/0048785 A1 * | 12/2001 | Steinberg | | 385/20 |

* cited by examiner

*Primary Examiner* — Daniel Petkovsek

(57) ABSTRACT

Exemplary systems and methods for testing communication media and devices are disclosed herein. An exemplary system may include a transmitting media support and a receiving media support, each including a plurality of communication media. The system may further include a movement support configured to selectively translate the receiving media support relative to the transmitting media support between a transmission position and a free position. In the transmission position, a receiving media may be engaged with the transmitting media to receive an initiated signal from the transmitting media. In the free position, a first end face of the receiving media may be spaced apart from a second end face of the transmitting media, thereby preventing contact between the first and second end faces. The movement support may be further configured to align the at least one of the receiving media with the transmitting media.

22 Claims, 5 Drawing Sheets

COMMUNICATION MEDIA MULTI-SWITCH SYSTEM

BACKGROUND

A variety of connectors have been developed for communication media, especially in the case of more damage-prone media such as optical fibers, to simplify connection of the media and protect the media from damage. Connectors may also enhance the quality of a connection by reducing signal losses and noise at interfaces between the communication media. For example, angled connectors may be employed for optical fibers to protect an end of the fiber, while also providing an angled end face. The angled end face may generally minimize transmission signal return losses, such as by reducing back reflection in optical signals.

Known connectors, including angled connectors, typically must be engaged and disengaged individually due to their unique features. For example, connectors defining angled end faces must generally be aligned and connected individually to ensure a proper alignment with a similarly angled interface. Accordingly, connectors may be cumbersome to use in environments where a large number of connections are employed, such as to provide a signal from a central office to a large number of end users. Such environments are common, e.g., for large office buildings, apartment buildings, hotels, or any geographically-based groups of customers or end users. The connectors are similarly cumbersome in testing or laboratory environments that replicate real-life conditions and field environments.

Accordingly, there is a need for more efficient systems and methods to provide robust connections between communication media, while improving the ease of engaging and disengaging communication media.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Various exemplary illustrations of communication systems and methods of using the same are disclosed herein. An exemplary system may include a transmitting media support and a receiving media support, each including a plurality of communication media, including transmitting media and receiving media. The communication media may be configured to receive an initiated signal from a transmitter. The system may further include a movement support configured to selectively translate the receiving media support relative to the transmitting media support between a transmission position and a free or non-transmission position. In the transmission position, at least one of the receiving media may be engaged with the transmitting media to receive an initiated signal from the transmitting media. In the free position, an end face of the receiving media, or first end face, is spaced apart from an end face of the transmitting media, or second end face, thereby preventing contact between the first and second end faces. The movement support may be further configured to align the at least one of the receiving media with the transmitting media when the receiving media support is adjacent the transmitting position. In one exemplary illustration, the movement support aligns the receiving media with the transmitting media as the receiving media and transmitting media are brought into communication, e.g., in the transmitting position.

An exemplary method includes receiving a communication media selection identifying at least one receiving media included in a plurality of communication media. The method may further include moving the plurality of communication media to a free or non-transmission position, wherein each of the plurality of communication media are spaced away from a transmitting media, that is configured to propagate a signal into the receiving media, and translating the receiving media to a transmission position such that the receiving media is engaged with the transmitting media to receive the signal from the transmitting media. The method may further include maintaining an alignment at least one end face of the receiving media generally parallel to at least one end face of the transmitting media while moving the plurality of communication media between the free position and the transmission position.

Figure 1A:
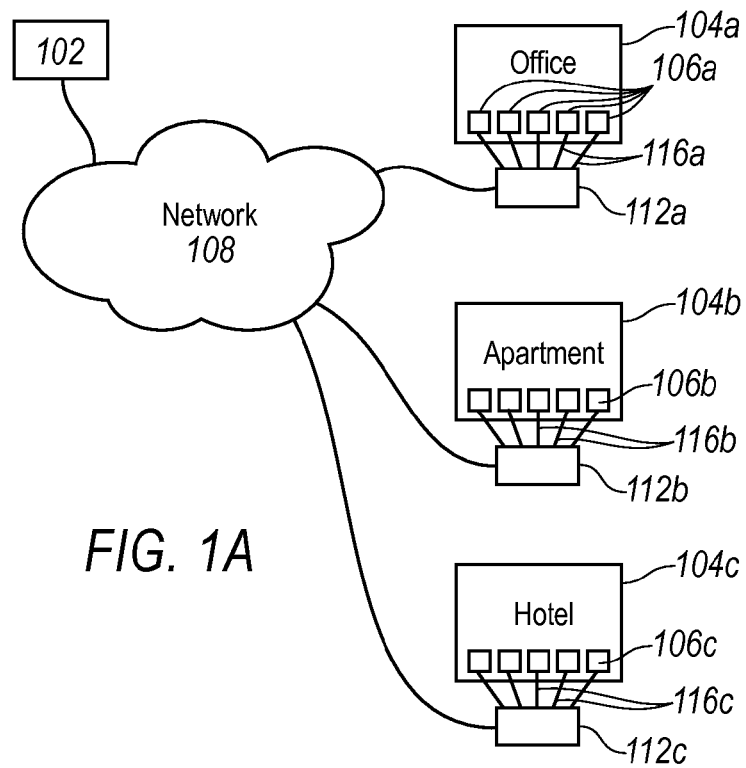
FIG. 1A illustrates a schematic illustration of an exemplary communication system having a multi-switch media system.
Figure 1B:
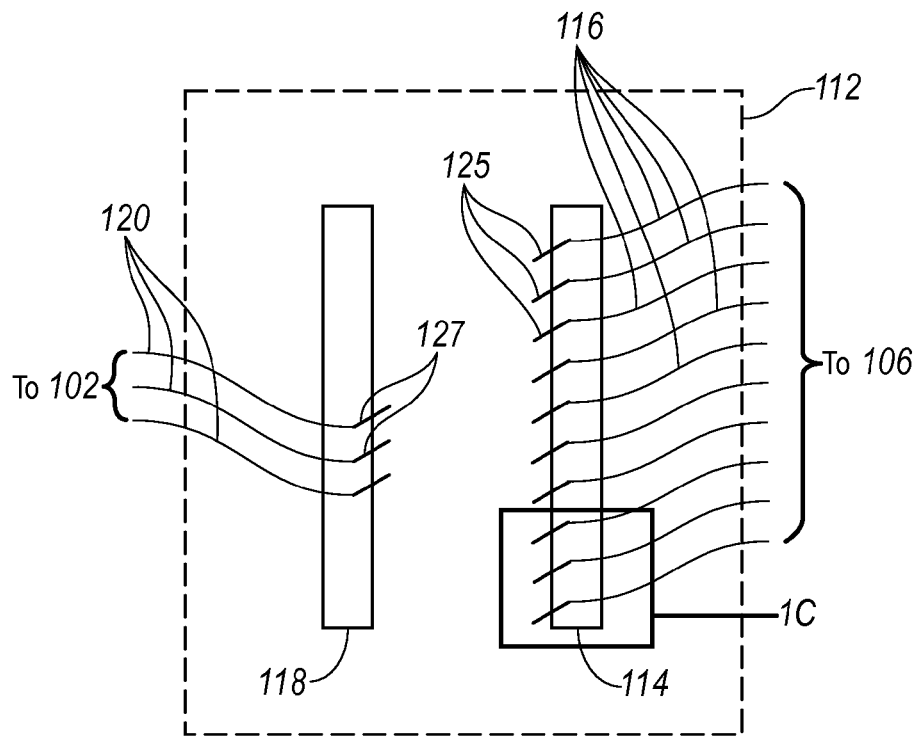
FIG. 1B illustrates a schematic illustration of the exemplary multi-switch media system of FIG. 1A.
Figure 1C:
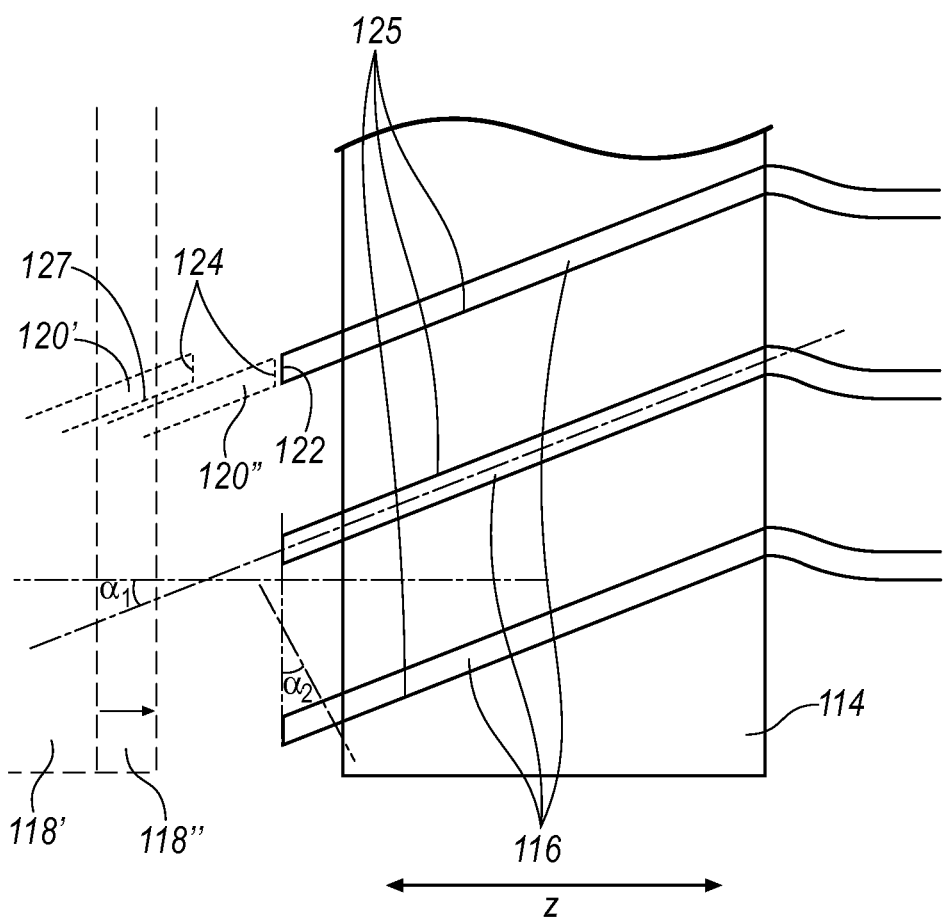
FIG. 1C illustrates an enlarged view of a portion of the schematic illustration of the of FIG. 1B.

Turning now to FIGS. 1A, 1B and 1C, an exemplary communication system 100 is illustrated. The system 100 may generally include a central office or transmitter 102 that transmits initiated signals, e.g., optical signals, to a plurality of customers or end user devices 106. In one exemplary illustration, the transmitter 102 is in communication with the devices 106 via a network 108. Network 108 may be any appropriate type of network including, for example, a packet-switched network, such as an internet protocol (IP) network, and/or a circuit-switched network. Accordingly, it is to be understood that network 108 may include switches, links, routers, gateways, etc. as necessary to facilitate the transmission of data between various computer and mobile devices. The system 100 may be in further communication with additional communications networks and/or systems (not shown), e.g., any known types of media distribution networks, packet-switched networks, telephone networks, or the like.

In one exemplary illustration, system 100 is a media distribution testing system where transmitter 102 provides test media or signals via network 108 to the end user devices 106.

Exemplary test media may include any signals or media convenient for testing components of media content distribution systems, e.g., data, voice, or video content such as movies, television shows, games, or other media commonly selected by recipients via devices 106, e.g., televisions and/or set top boxes. In another exemplary illustration, mobile devices (not shown) may be in communication with transmitter 102 via mobile networks in communication with or comprising a subset of network 108. The system 100 may generally allow for two-way communication between the devices 106, e.g., to simulate selections or requests via a set-top box, TV, mobile device, or other equipment (not shown). The system 100 is generally described herein as being provided in a laboratory or simulation environment, as opposed to a field environment. The concepts described herein are equally applicable to customer networks, e.g., as employed by service providers to distribute media content to customers and their associated devices under actual use conditions and applications.

As best seen in FIG. 1A, the devices 106 may be arranged in groups 104 to simulate groups of users in real-world customer networks. For example, groups 104 may each represent office buildings, apartments, hotels, or the like, where a number of end users 106 may be located together.

The devices 106 may generally communicate with transmitter 102 via associated customer lines or receiving media 116a, 116b, 116c (collectively, 116). Moreover, the receiving media 116 of a given group 104 may all communicate via a relatively smaller number of media connector assemblies 112a, 112b, 112c (collectively, 112). For example, as illustrated in FIG. 1A there may be a single media connector assembly 112 for each group 104, which generally allows connection of the plurality of receiving media 116 to the media connector assembly 112.

Where the system 100 is being implemented as a testing system, e.g., of communication media or devices associated with the system 100, the transmitter 102 may include a controller for selecting devices to be tested. For example, transmitter 102 may send a communication identifying a particular communication media 116 and/or device 106, and may generally move selected media 116 using exemplary movement systems described below, to allow communication with the transmitter 102 for testing.

Computing devices in various examples, such as transmitter 102, may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Turning now to FIG. 1B, an exemplary media connector assembly 112 is illustrated in further detail. Media connector support 112 may include a receiving media support 114 and a transmitting media support 118. Transmitting media support 118 may generally support one or more transmitting media 120, which may be inserted into apertures 127 defined by the transmitting media support 118. The transmitting media 120 may each be in communication with transmitter 102. The receiving media support 114 may similarly support a plurality of receiving media 116, each of which being associated with one or more of the devices 106. The receiving media 116 may be inserted into apertures 125 defined by the receiving media support 114. In one exemplary illustration, the transmitting media 120 may be used to provide one or more test signals to the receiving media 116, e.g., to measure performance of the receiving media, associated devices 106, or any other components of the system 100. While the exemplary approach illustrated in FIG. 1B includes a media connector support 112 having fewer transmitting media 120 than receiving media 116, any number of transmitting media 120 or receiving media 116 may be employed, including examples where more transmitting media 120 are employed.

Referring now to FIG. 1C, the operation of an exemplary media connector support 120 is explained in further detail. The transmitting media support 118 and receiving media support 114 are illustrated in two relative positions. More specifically, the transmitting media support 118 may be placed in a first relative position or non-transmission free position (represented by 118'), wherein the media 116, 120 are spaced apart, thereby preventing contact and any communication between the media 116, 120. The transmitting media support 118 may also be placed in a second relative position or transmitting position (represented by 118"), wherein the transmitting media 120 is placed in contact with the receiving media 116.

The media 116, 120, and in particular the end faces 122, 124, may generally remain aligned as a result of the apertures 125, 127 defined by the receiving media support 114 and transmitting media support 118, respectively. In one exemplary illustration, the apertures 125, 127 are formed in a drilling process, and define an identical angle relative to facing surfaces of the media supports 114, 118, thereby placing the media 116, 120 in a same angular alignment. Accordingly, where end faces 122, 124 also define a substantially identical angle, the end faces 122, 124 may be maintained in a parallel alignment.

As will be described further below, the media supports 114 and/or 118 may also be moveable relative to one another to facilitate selectively engaging one or more of the transmitting media 120 with one or more of the receiving media 116. For example, where system 100 is testing various parameters of components in system 100, e.g., receiving media 116 or devices 106, the media supports 114 and/or 118 may generally facilitate an automated engagement and disengagement of the various receiving media 116 with one or more of the transmitting media 120.

Transmitting media 120 and receiving media 116 may each terminate to define respective end faces 124 and 122. The end faces 122, 124 may be generally aligned for contact with one another, thereby permitting communication between transmitting media 120 and the receiving media 116. In one exemplary illustration, the media 116, 120 are formed of a light-transmitting material, e.g., an optical fiber, and may transmit optical signals between to the two media 116, 120 as a result of the contact of the end faces 122, 124. Accordingly, when the end faces 122 and 124 are brought into alignment and possibly abutting contact, the media 116 and 120 may transmit a signal, e.g., an optical signal, across an interface between the end faces 122 and 124.

In another exemplary illustration, an angled physical contact (APC) connector is provided, that generally defines an interface that is angled with respect to a longitudinal axis of the media 116, 120. For example, as shown in FIG. 1C, both of the end faces 122 and 124 are angled by a predetermined angle $\alpha_1$ with respect to a longitudinal axis of the transmitting media 120 and receiving media 116. In one example, the angle α may be approximately eight (8) degrees, however any angle may be employed that is convenient. Moreover, the angle $\alpha_1$ between the end faces 122 and 124 and their respective media axes may be substantially equal, thereby permitting adequate alignment of the end faces 122, 124 to facilitate communication across an interface between the end faces 122, 124.

The receiving media support 114 and/or transmitting media support 118 may generally align the end faces 122, 124 to minimize signal losses across the end faces 122, 124 when placed into contact such as by being adjacent to one another or even direct abutment. Additionally, precise alignment of the end faces 122, 124 by the supports 114, 118 may reduce damage to the end faces 122, 124 as a result of frequent or rapid connection and disconnection of the media 116, 120.

In one exemplary illustration, the apertures 125 of the receiving media support 114 align the receiving media 116 at an angle $\alpha_2$ with respect to a direction of movement Z of the receiving media support 114 relative to the transmitting media support 118, as best seen in FIG. 1C. The angles $\alpha_1$ and $\alpha_2$ may be substantially equal, thereby aligning the end face 122 generally perpendicular to a direction of movement Z of the receiving media support 114 relative to the transmitting media support 118.

The angled end face 122 of the receiving media 116 may generally be maintained in a substantially parallel relationship to a mating end face 124 of the transmitting media 120. In addition to minimizing signal transmission losses across the interface between the end faces 122, 124, a substantially parallel relationship between the end faces 122 and 124 may generally minimize the incidence of damage to the end faces 122, 124 during engagement and disengagement of the receiving media 114 and transmitting media 120. For example, parallel end faces 122, 124 may generally evenly engage and disengage from one another, thereby minimizing uneven application of contact forces between the end faces 122, 124 when a connection is being changes. Moreover, alignment of each of the plurality of receiving media 116 in a same configuration, e.g., a same angle $\alpha_2$, may also promote relatively quick disconnection of the transmitting media 120 from a first one of the receiving media 116, and connection to another of the receiving media 116.

As noted above, media supports 114 and 118 may be generally moved relative to one another between a free or non-transmission position, where the receiving media 116 and the transmitting media 120 are spaced apart, and the transmitting position, where the media 116 and 120 are in communication with one another, and may in some cases be in direct contact. Any method of moving the media supports 114, 118 relative to one another that is convenient may be employed.

Figure 2A:
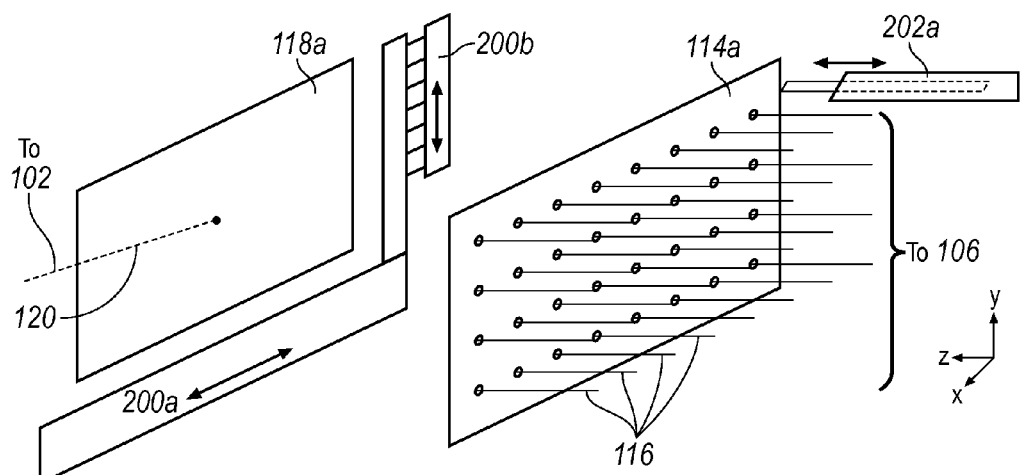
FIG. 2A illustrates a schematic illustration of an exemplary media support using a Cartesian coordinate layout used in the exemplary device of FIG. 1B.

Referring now to FIG. 2A, an exemplary receiving media support 114a and transmitting media support 118a that have media 116, 120 arranged in a grid or Cartesian coordinate layout. The receiving media support 114a and transmitting media support 118a employ a plurality of movement supports for imparting relative movement based upon the grid layout, e.g., of the receiving media 116. More specifically the receiving media 116 are generally arranged in a grid, and distributed along the X and Y relative directions as illustrated in FIG. 2A. Accordingly, different receiving media 116 may be selectively aligned with and connected to a transmitting media 120, e.g., to facilitate testing of the receiving media 116 and/or devices 106 (not shown in FIG. 2A). More specifically, the receiving media support 114a may be moved in the X and Y directions relative to the transmitting media support 118a, thereby aligning a selected one of the receiving media 116 with the transmitting media 120. Once the selected receiving media at 116 is aligned with the transmitting media support 120, the receiving media support 114 may be moved toward the transmitting media support 118a, i.e., in a Z-direction to selectively place the transmitting media 120 in communication with the selected receiving media 116.

In the exemplary illustration shown in FIG. 2A, the transmitting media support 118a is supported by a first lateral support 200a and a second lateral support 200b. The first lateral support 200a is configured to move the transmitting media support 118a in the X-direction relative to the receiving media support 114a. The second lateral support 200 B may be configured to move the transmitting media support 118a in the Y-direction relative to the receiving media support 114a. A longitudinal movement support 202a may also be provided that selectively moves the receiving media support 114a further away from or closer to the transmitting media support 118a, i.e., in the Z-direction relative to the transmitting media support 118a.

Figure 2B:
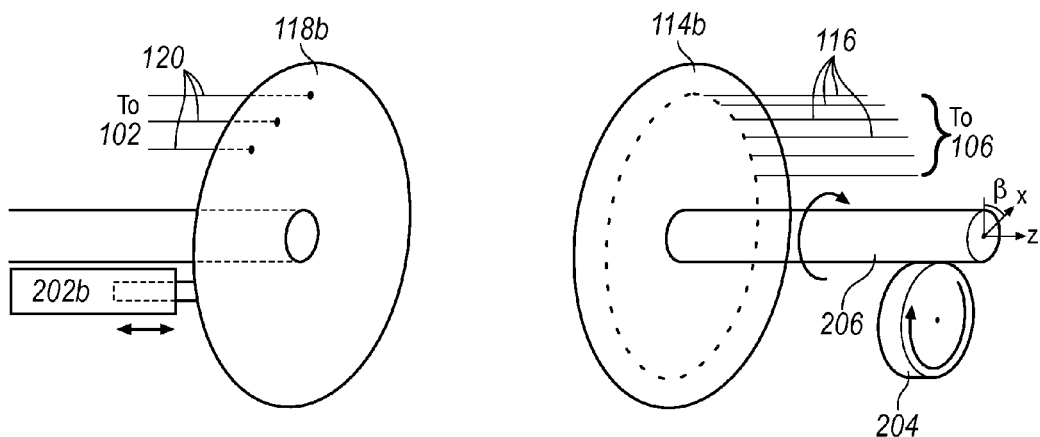
FIG. 2B illustrates a schematic illustration of an exemplary media support using a polar coordinate layout used in the exemplary device of FIG. 1B.

Referring now to FIG. 2B, another exemplary media support movement system is illustrated that uses a generally circular or polar coordinate layout. More specifically, the exemplary illustration of FIG. 2B illustrates a receiving media support 114b having a generally disc like configuration. The receiving media 116 may be positioned in a generally circular fashion about a perimeter of the receiving media support 114b. One or more transmitting media 120 may be positioned in the transmitting media support 118b in a generally circular arrangement similar to that of the receiving media support 114b. For example, the transmitting media support 118b may be generally coaxial with respect to the receiving media support 114b. Accordingly, as will be described further below, one or more of the transmitting media 120 may be aligned with receiving media 116 by rotating the receiving media support 114b relative to transmitting media support 118b.

As illustrated in FIG. 2B, the receiving media support 114b may be disposed on a spindle 206 that is rotated selectively by a gear 204. The spindle 206 may in turn rotate the receiving media support 114b, thereby rotating the plurality of receiving media that are disposed in the receiving media support 114b with respect to the transmitting media support 118b. Additionally, the relative distance between the receiving media support 114b and transmitting media support 118b may be increased or decreased to bring a selected one or more of the receiving media 116 into contact with transmitting media 120.

The transmitting media support 118*b* and/or receiving media support 114*b* may be adjusted in the longitudinal direction, i.e., to be closer together or further away from each other, by a longitudinal movement support 202*b*, as shown by "Z." Accordingly, one or more receiving media 116 may be identified using a polar coordinate that identifies an angular position of the selected receiving media 116 within the receiving media support 114*b*.

While receiving media 116 are illustrated in a generally single circle on the receiving media support 114, additional receiving media may be disposed in additional circles concentric with the other receiving media on the receiving media support 114. In such examples, a selected receiving media 116 may be identified using an angular coordinate as well as a radial distance from a center location of the circle to the selected receiving media 116.

Figure 3A:
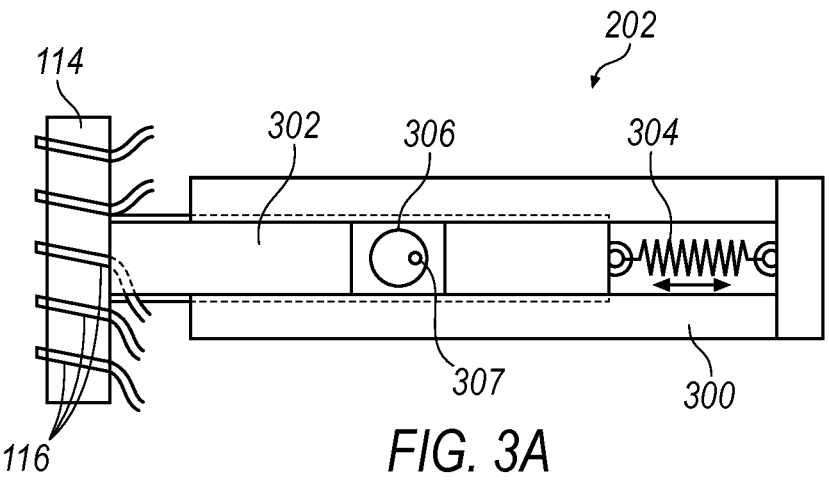
FIGS. 3A-3C illustrate an exemplary media support movement device.
Figure 3B:
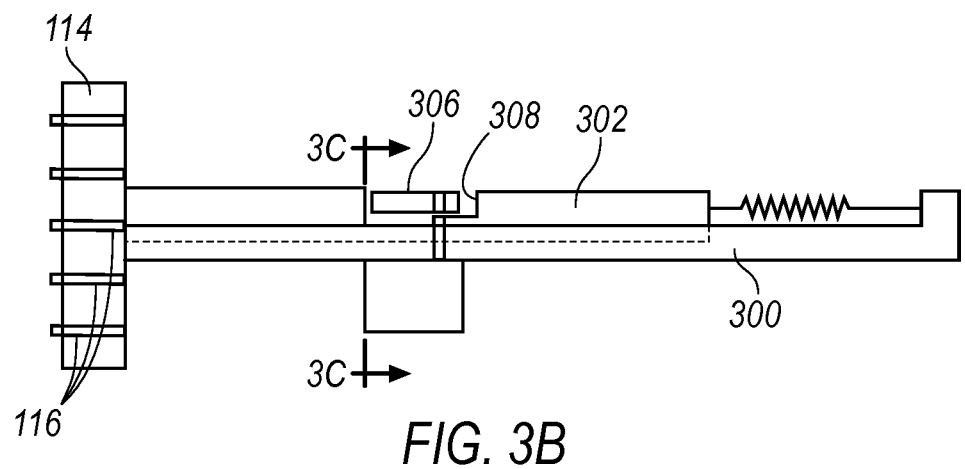
Figure 3C:
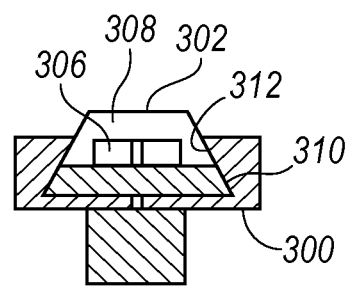

Turning now to FIGS. 3A-3C, an exemplary longitudinal movement support 202 is illustrated. Longitudinal movement support 202 may be configured to selectively move one of the media supports 114, 118 longitudinally, i.e., to increase or decrease a relative distance between the media supports 114, 118. Longitudinal movement support 202 may include a support arm 300 having an extension arm 302. The extension arm 302 may be generally fixed to one of the media supports 114 and/or 118, and may slide longitudinally with respect to the support arm 300. For example, as shown in the exemplary illustration of FIGS. 3A and 3B, the extension arm 302 may be fixed to receiving media support 114. The extension arm 302 may move longitudinally with respect to support arm 300 to impart movement in the same direction to the receiving media support 114. In the exemplary illustration extension arm 302 moves within support arm 300.

The longitudinal movement support 202 may also include a biasing mechanism 304 to bias a position of the extension arm 302 with respect to the support arm 300. For example, as best seen in FIGS. 3A and 3B, a compression spring 304 may be provided that generally biases the extension arm 302 in a direction toward the receiving media support 114. Accordingly, the receiving media support 114 may be similarly biased in a direction toward the transmitting media support 118 (not illustrated in FIGS. 3A through 3C). The longitudinal movement support 202 may thereby generally prevent disengagement of receiving media 116 from transmitting media 120. 120 (not illustrated in FIGS. 3A-3C).

Movement of the extension arm 302 with respect to support arm 300 may be enacted in any manner that is convenient. In the exemplary illustration of FIGS. 3A through 3C, the extension arm 302 is generally received within a cavity of the support arm 300 defined in part by inclined walls 312. The extension arm 302 may define corresponding inclined walls 310 that generally slide along the inclined walls 312 of the support arm 300. Moreover, the inclined walls 310 and 312 generally prevent movement of the extension arm 302 out of the cavity defined by the supporter arm 300. The extension arm 302 is thereby generally retained within the cavity defined by the support arm 300, but may generally slide longitudinally with respect to the support arm 300 to impart longitudinal movement to the receiving media support 114.

As best seen in FIGS. 3A and 3B, an off-center wheel 306 rotating about pivot point 307 may be provided to slide the extension arm 302 with respect to the support arm 300. More specifically, the off-center wheel 306 may be rotated to selectively engage a wheel engagement surface 308 of the extension arm 302 (see FIG. 3B). As a result of the biasing member 304, the extension arm 302 may generally be urged out of the cavity of the support arm 300, thereby pushing the receiving media support 114 into engagement with the transmitting media support 118 (not illustrated in FIGS. 3A through 3C). The off-center wheel 306 may be rotated to engage the wheel engagement surface 308 and counteract the biasing force of the compression spring 304, thereby moving the extension arm 302 back into the cavity of the support arm 300 and pulling the receiving media support 114 away from the transmitting media support 118.

Figure 4:
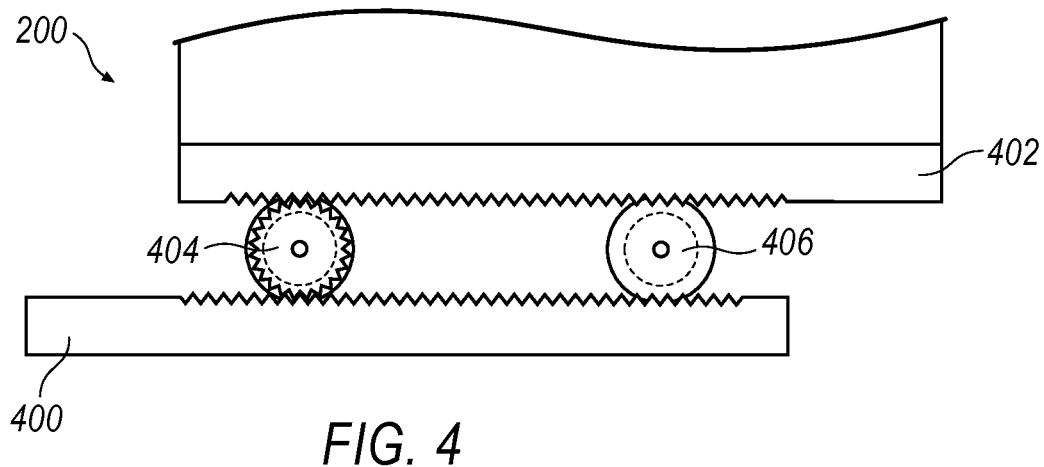
FIG. 4 illustrates another exemplary media support movement device.

Turning now to FIG. 4, an exemplary lateral movement support 200 is illustrated. The lateral support 200 may include opposing lateral arms 400, 402, which are moved laterally relative to one another by two gear wheels 404, 406. In the exemplary illustration of FIG. 4, gear wheel 404 is a driven wheel that imparts movement of the lateral arms 402 and 400 relative to one another, depending on which way the gear wheel 404 is rotated. The gear wheel 406 need not be driven, and may simply support the lateral arms 400, 402 and rotate passively according to movement of the lateral arms 400, 402. To impart lateral movement using the lateral movement support 200, one of the lateral arms, e.g., lateral arm 400 may be secured to a stationary or fixed surface. Rotation of the driven wheel 404 may thereby translate the opposing lateral arm 402 depending on which direction the wheel 404 is driven. In one exemplary illustration, the opposing lateral arm 402 is secured to a media support to impart lateral movement to the support. For example, a lateral arm 402 may be secured to transmitting media 200*a* (see FIG. 2A), thereby moving the transmitting media support 118*a* in the X-direction relative to the receiving media support 114*a*.

Figure 5:
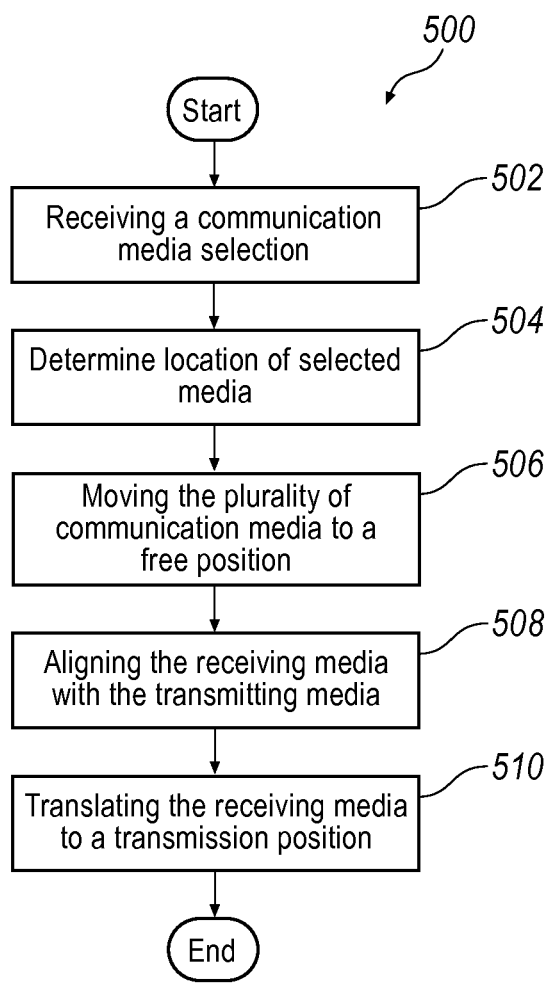
FIG. 5 illustrates a process flow diagram of an exemplary method for connecting a plurality of communication media with a transmitting media.

Turning now to FIG. 5, an exemplary process 500 for testing a plurality of communication media is illustrated. Process 500 may generally begin at block 502, where a communication media selection is received. For example, transmitter 102 may select a receiving media 116 to be tested, e.g., according to an input from service personnel. Transmitter 102 may be configured to test any of the receiving media 116 and/or associated devices 106. Process 500 may then proceed to block 504.

At block 504, a location of a selected media may be determined. For example, a coordinate or position of the receiving media 116 may be determined by the transmitter 102. Moreover, the transmitter 102 may determine any movements necessary to disconnect any active receiving media 116 and move the desired receiving media 116 to place it in communication with the transmitting media 120. For example, as described above receiving media may be arranged in a grid or circular layout that allows identification of a receiving media 116 by a Cartesian coordinate or polar coordinate.

Proceeding to block 506, a plurality of communication media may be moved to a free position. For example, as described above, receiving media 116 may be spaced away from transmitting media 120, which is configured to propagate a signal in the receiving media, to allow movement of the receiving media with respect to the transmitting media. Moreover, as described above, the receiving media 116 may be spaced apart a predetermined distance to prevent any contact between end faces 122, 124 of the receiving media 116 and/or transmitting media 120. Process 500 may then proceed to block 508.

At block 508, the selected receiving media 116 may be aligned with the transmitting media 120. For example, end faces 122, 124 of the selected receiving media 116 and transmitting media 120 may be aligned in the free position, i.e., when spaced apart, and positioned such that a further longitudinal movement brings the end faces 122, 124 into communication with one another, and in some cases into direct contact. In some exemplary illustrations, the end faces 122, 124 are aligned parallel to one another, and may each define predetermined angles with respective lengths of the media 116, 120 that are substantially equal. For example, as described above the receiving media 116 may be received in corresponding apertures 125

Proceeding to block 510, the receiving media 116 may be translated to a transmission position wherein the end faces 122, 124 are in communication to allow a signal, e.g., an optical signal, to be transmitted across an interface between the receiving media 116 and transmitting media 120 that includes the end faces 122, 124. Process 500 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a receiving media support, including a plurality of receiving communication media configured to receive an initiated signal from a transmitter, and defining a plurality of apertures into which the plurality of receiving media are inserted;
   a transmitting media support, including at least one transmitting communication media configured to transmit the initiated signal from the transmitter to the receiving media, and defining at least one aperture into which the at least one transmitting media is inserted and from which an end of the at least one transmitting media protrudes in the direction of the receiving media support; and
   a movement support configured to selectively translate the receiving media support in a longitudinal direction between a transmission position, wherein at least one of the receiving media is in mechanical contact with the transmitting media to receive the initiated signal from the transmitting media, and a free position, wherein the receiving media support and the transmitting media support are spaced apart in the longitudinal direction such that a first end face of the receiving media is spaced apart from a second end face of the transmitting media, thereby preventing contact between the first and second end faces;
   wherein the movement support is configured to align the at least one of the receiving media with the transmitting media when the receiving media support is adjacent the transmitting position.

2. The system of claim 1, wherein the movement support is configured to prevent a relative movement between the transmitting media support and the receiving media support when the receiving media support is in the transmission position, the relative movement in a direction generally perpendicular to the transmitting media and the receiving media.

3. The system of claim 1, wherein the apertures defined by the receiving and transmitting media supports align the first and second end faces to be substantially parallel.

4. The system of claim 1, wherein the plurality of receiving media are arranged in a grid pattern in the receiving media support.

5. The system of claim 1, wherein the plurality of receiving media are arranged in a circular pattern in the receiving media support.

6. The system of claim 5, wherein the movement support is configured to rotate the receiving media support about an axis.

7. The system of claim 1, wherein the receiving media and transmitting media each include angled physical contact connectors defining the first and second end faces.

8. The system of claim 1, wherein the first end face defines a first predetermined angle with respect to an associated receiving media length, and the second end face defines a second predetermined angle with respect to an associated transmitting media length.

9. The system of claim 8, wherein the first and second predetermined angles are equal.

10. The system of claim 8, wherein the first and second predetermined angles are each approximately eight degrees.

11. The system of claim 1, further comprising a test controller configured to selectively move the receiving media support relative to the transmission media support, wherein the test controller is configured to determine a parameter associated with the plurality of receiving media.

12. The system of claim 1, wherein each of the plurality of apertures defined by the receiving media support are configured to align a respective one of the plurality of receiving media at an angle with respect to a longitudinal direction of translation of the receiving media support.

13. The system of claim 1, further comprising a second movement support configured to selectively translate the transmitting media support in a lateral direction orthogonal to the longitudinal direction.

14. The system of claim 13, further comprising a third movement support configured to selectively translate the transmitting media support in a lateral direction orthogonal to the longitudinal direction and to the lateral direction in which the second movement support selectively translates the transmitting media support.

15. The system of claim 1, wherein the movement support includes a support arm static with respect to the receiving media, and an extension arm fixed to the receiving media such that the extension arm moves with respect to the support arm when the movement support translates the receiving media support between the free position and the transmission position.

16. The system of claim 15, wherein the support arm defines a cavity in which the extension arm is at least partially disposed and in which the extension arm is slidable.

17. The system of claim 16, wherein the support arm has inclined walls defining the cavity, and the extension arm has corresponding inclined walls that generally slide along the inclined walls of the support arm to prevent the extension arm from disengaging from the support arm.

18. The system of claim 15, wherein the movement support further includes a biasing mechanism attached to the support arm and the extension arm, the biasing mechanism being configured to bias the receiving media support in the transmission position.

19. The system of claim 18, wherein the movement support further includes a wheel attached to the extension arm and the support arm via a pin that is off-center and around which the wheel is rotatable, the wheel being configured to engage an engagement surface of the extension arm to counteract the biasing of the receiving media support in the transmission position by pulling the receiving media support away from the transmitting media support.

20. A method comprising:
inserting a plurality of receiving communication media into at least a subset of apertures defined by a receiving media support, the receiving media configured for receiving an initiated signal from a transmitter;
inserting at least one transmitting communication media into at least one aperture defined by a transmitting media support until an end of the at least one transmitting media protrudes from the at least one aperture in the direction of the receiving media support, the at least one transmitting media configured to transmit the initiated signal from the transmitter to the receiving media; and
selectively translating, via a movement support, the receiving media support in a longitudinal direction between a transmission position in which at least one of the receiving media is in mechanical contact with the transmitting media to receive the initiated signal from the transmitting media, and a free position in which a first end face of the receiving media is spaced apart from a second end face of the transmitting media, thereby preventing contact between the first and second end faces; and
aligning, via the movement support, the at least one of the receiving media with the transmitting media when the receiving media support is adjacent the transmission position.

21. The method of claim 20, further comprising preventing, via the movement support, a relative movement between the transmitting media support and the receiving media support when the receiving media support is in the transmission position, wherein the relative movement is in a direction generally perpendicular to the transmitting media and the receiving media.

22. The method of claim 20, further comprising determining a parameter associated with the plurality of receiving media when selectively moving the receiving media support relative to the transmission media support.

* * * * *